United States Patent [19]

Noguchi et al.

[11] Patent Number: 5,652,745
[45] Date of Patent: Jul. 29, 1997

[54] OPTICAL SYSTEM USING POLARIZED LIGHT WITH PREVENTION OF EFFECT OF BIREFRINGENCE

[75] Inventors: Masato Noguchi; Tsuyoshi Ishikawa, both of Tokyo, Japan

[73] Assignee: Asahi Kogaku Kogyo Kabushiki Kaisha, Tokyo, Japan

[21] Appl. No.: 286,379

[22] Filed: Aug. 4, 1994

Related U.S. Application Data

[63] Continuation of Ser. No. 65,686, May 24, 1993, abandoned, which is a continuation of Ser. No. 725,647, Jul. 3, 1991, abandoned.

[30] Foreign Application Priority Data

Jul. 9, 1990 [JP] Japan .................. 2-181184

[51] Int. Cl.⁶ ............... G11B 7/00; G02B 5/30; G02B 27/28
[52] U.S. Cl. ............... 369/110; 369/112; 369/13; 359/494; 359/499
[58] Field of Search ............... 359/483–485, 359/488, 489, 494–500; 369/112, 100, 109, 110, 121, 122, 13; 360/59, 114

[56] References Cited

U.S. PATENT DOCUMENTS

| | | | |
|---|---|---|---|
| 4,397,527 | 8/1983 | Geyer | 359/497 |
| 4,400,062 | 8/1983 | Mori et al. | 359/500 |
| 4,631,334 | 12/1986 | Masumoto et al. | |
| 4,682,311 | 7/1987 | Matsubayashi et al. | 369/112 |
| 4,766,303 | 8/1988 | Yoshizumi et al. | 359/494 |
| 4,774,615 | 9/1988 | Revelli et al. | 350/114 |
| 4,789,978 | 12/1988 | Shikama et al. | 369/112 |
| 4,885,734 | 12/1989 | Yuzo . | |
| 5,029,154 | 7/1991 | Sumi et al. . | |
| 5,033,828 | 7/1991 | Haruta | 359/495 |

FOREIGN PATENT DOCUMENTS

| | | |
|---|---|---|
| 0241372 | 10/1987 | European Pat. Off. . |
| 0372881 | 6/1990 | European Pat. Off. . |
| 3512838 | 10/1985 | Germany . |
| 3716573 | 11/1987 | Germany . |
| 3938639 | 5/1990 | Germany . |
| 58-108007 | 6/1983 | Japan . |
| 63-113838 | 5/1988 | Japan . |
| 1137435 | 5/1989 | Japan . |
| 1347169 | 2/1974 | United Kingdom . |
| 1360922 | 7/1974 | United Kingdom . |
| 1601574 | 10/1981 | United Kingdom . |

OTHER PUBLICATIONS

English Language Abstract of Japanese Publication, 1,137,435.
English Language Abstract of JP–63–113838.
English Language Abstract of Japanese Publication 02–146517.

*Primary Examiner*—Thai Tran
*Attorney, Agent, or Firm*—Greenblum & Bernstein, P.L.C.

[57] ABSTRACT

An optical system using polarized light is provided wherein a polarized light beam from an optical source is made to coincide with the natural polarization of the optical element acting upon the light beam. The polarization of the light beam from the optical source is adjusted to be effectively the same as the natural polarization of an optical element with birefringence upon which it is incident, and consequently the birefringence of this element has no effect on the convergence of the beam.

10 Claims, 1 Drawing Sheet

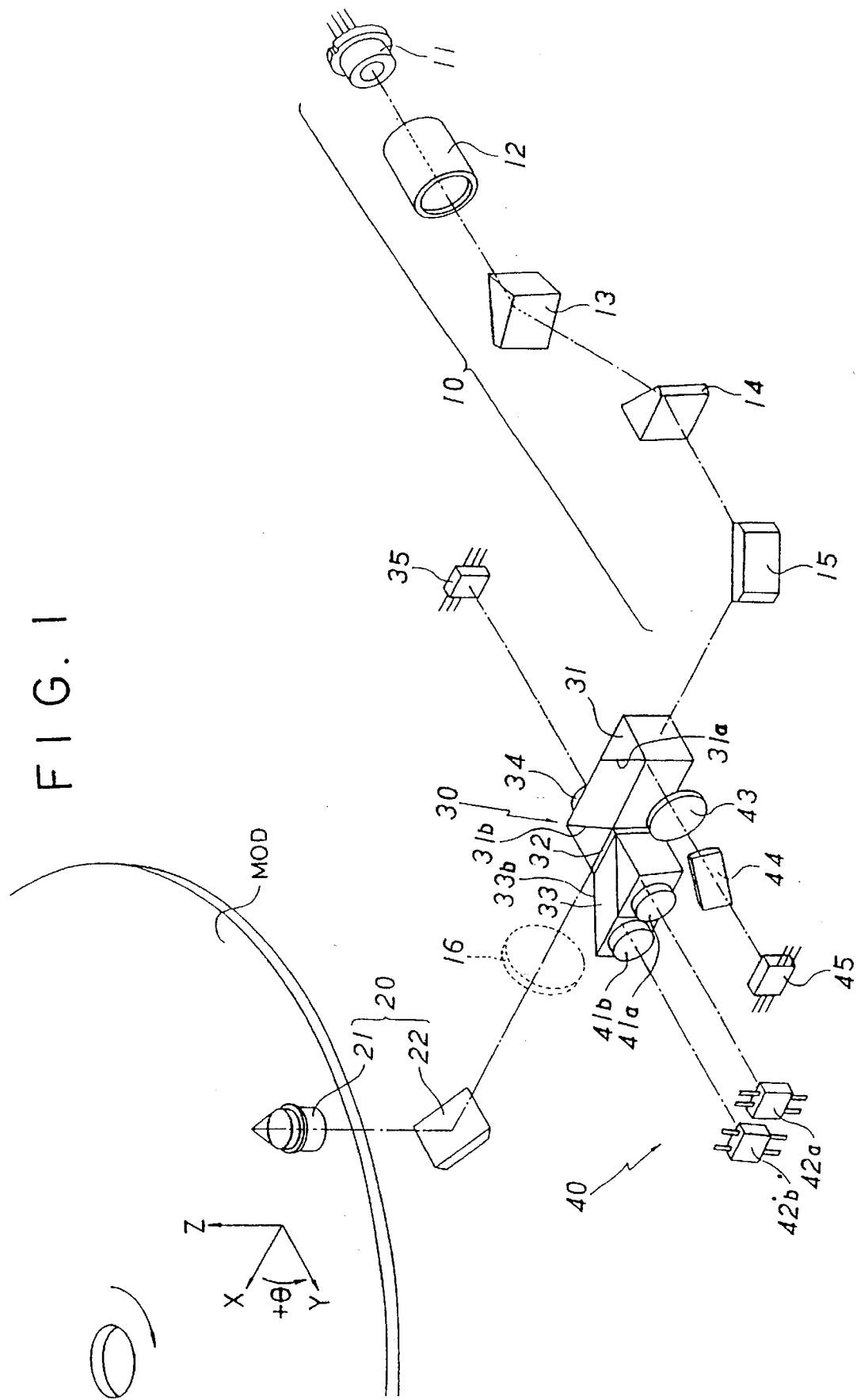

OPTICAL SYSTEM USING POLARIZED LIGHT WITH PREVENTION OF EFFECT OF BIREFRINGENCE

This application is a continuation of application Ser. No. 08/065,686, filed May 24, 1993, now abandoned, which is a continuation of application Ser. No. 07/725,647, filed Jul. 3, 1991, now abandoned.

BACKGROUND OF THE INVENTION

1. Field of the Invention

This invention concerns an optical system having an optical source that emits a polarized light beam, and which is able to use this polarized light without suffering the effect of the birefringence of the system.

2. Description of the Prior Art

In the prior art, magneto-optic disk devices are typical examples of devices that use polarized light beams.

In optical systems that use magneto-optic disk devices, a signal is read by detecting a slight rotation in the direction of polarization as a change of optical intensity due to the magneto-optic Kerr effect when a laser beam is reflected from the disk surface. The type of laser beam which is used is a linearly polarized beam, for which a change in the direction of polarization is easiest to detect.

In such a system, however, if the lenses or other optical elements used also change the polarization state of the laser beam, the linear polarization of the beam may become elliptical. This weakens the signal and leads to errors when the signal is read.

In general, plastic lenses possess birefringence like crystals, and they change the polarization state of a laser beam. The lenses used in magneto-optic disk devices are therefore glass lenses.

Glass lenses are however heavier than plastic, and it is difficult to finish them aspherically. They therefore have aberrations which can only be corrected by increasing the number of component lenses, leading to an increased load on the actuator.

The lenses used in optical disk devices have to move at high frequencies for focussing and tracking purposes. It is therefore essential to make these devices compact and light weight to lighten the load on the actuator.

SUMMARY OF THE INVENTION

This invention aims to provide an optical system which, while using plastic lenses which possess birefringence, does not change the polarization state of the light beam emitted by the light source.

The polarized light system of this invention is characterized by the fact that the polarization of the source light beam is made to coincide with the natural polarization of the optical elements that use this light beam.

In the construction of the invention, the polarization of the source light beam practically coincides with this natural polarization when it is incident on these optical elements with birefringence, and the birefringence therefore has no effect when the beam is converged. In other words, when a linearly polarized light beam transmits through an optical element with birefringence without changing the polarized condition, the directivity of this linearly polarized light beam is defined as a natural polarization of the optical element.

BRIEF DESCRIPTION OF THE DRAWINGS

FIG. 1 illustrates an optical recording and reproduction device which is an example of the polarized light system of this invention.

DETAILED DESCRIPTION OF THE EMBODIMENTS

One embodiment of the present invention will now be described with reference to the drawings. The present disclosure relates to subject matter contained in Japanese Patent Application No. H2-181184 (filed on Jul. 9, 1990), which is expressly incorporated herein by reference in its entirety.

We shall first describe the principle of the invention. In the following description, the polarizing effect of the optical elements is considered as a matrix.

As glass elements have no birefringence, an optically parallel surface plate can be considered as a unit matrix. For a lens with curved surfaces, the angle of the lens surface with respect to the incident light beam varies depending on the coordinates, and the polarization of the light will therefore change.

Plastic elements however inherently possess birefringence, and their effect cannot be considered as a unit matrix even in the case of parallel surfaces. Further, in the case of a plastic lens, there is also an effect due to the shape of the lens.

Taking the direction of progression of the wavefront of the light beam as the z axis, an x-y coordinate can be defined perpendicular to this z axis. Light is an electromagnetic radiation which satisfies Maxwell's equation, and its electrical vectors can therefore be split into two perpendicular components x and y, i.e.:

$$Px = ax \cdot \exp\{i(\omega t - 2\pi z/\lambda + \delta x)\}$$

$$Py = ay \cdot \exp\{i(\omega t - 2\pi z/\lambda + \delta y)\}$$

wherein $\omega$ is an angular frequency, $\lambda$ is wavelength, and $\delta x$, $\delta y$ are initial phases.

The two components of the above equations can be represented as a complex expression P which is known as a Jones vector:

$$P = \begin{bmatrix} Px \\ Py \end{bmatrix}$$

The change of polarization produced by a series of optical elements can be found by representing the incident vectors as Jones vectors, and summing the Jones matrices which represent the effect of each element in the series. In such a case, a matrix B representing the effect of a given optical element and the incident light Pi are defined as follows:

$$B = \begin{bmatrix} b11 & b12 \\ b21 & b22 \end{bmatrix}, Pi = \begin{bmatrix} Pxi \\ Pyi \end{bmatrix}$$

$$Po = \begin{bmatrix} Pxo \\ Pyo \end{bmatrix} = \begin{bmatrix} b11 & b12 \\ b21 & b22 \end{bmatrix} \begin{bmatrix} Pxi \\ Pyi \end{bmatrix}$$

If the incident light is completely polarized light, the exit light Po can be represented by the above equation. If the Jones matrix for light which has passed through pupil coordinates (u, v) is:

$$B(u,v) = \begin{bmatrix} b11(u,v) & b12(u,v) \\ b21(u,v) & b22(u,v) \end{bmatrix}$$

the polarization state of the light beam at the image point is:

$$\begin{bmatrix} Pxo \\ Pyo \end{bmatrix} = \int \begin{bmatrix} b11(u,v) & b12(u,v) \\ b21(u,v) & b22(u,v) \end{bmatrix} \begin{bmatrix} Pxi \\ Pyi \end{bmatrix} \cdot dudv$$

$$= \begin{bmatrix} \int b11(u,v)dudv & \int b12(u,v)dudv \\ \int b21(u,v)dudv & \int b22(u,v)dudv \end{bmatrix} \begin{bmatrix} Pxi \\ Pyi \end{bmatrix}$$

If we write:

$$\int bmn(u,v)dudv = Cmn$$

the above equation can then be written as follows:

$$\begin{bmatrix} Pxo \\ Pyo \end{bmatrix} = \begin{bmatrix} C11 & C12 \\ C21 & C22 \end{bmatrix} \begin{bmatrix} Pxi \\ Pyi \end{bmatrix}$$

This means that the effect on the polarized light due to optical elements can be represented by a Jones matrix even at the image point.

Optical elements of which the polarization characteristics can represented by a square matrix must have at least one set of natural values and natural vectors. If we define a natural value of C as k and the corresponding natural vector as α in the following way, we can write C=kα.

$$\alpha = \begin{bmatrix} \alpha x \\ \alpha y \end{bmatrix}$$

From the above relation, it is seen that if a light beam which has a state of polarization α is incident on the optical system, the state of polarization of the exit beam at the image point has not changed from what it was at the time of incidence. This is due to the natural polarization of optical elements with birefringence.

It is therefore evident that by making the incident polarization correspond to the natural polarization of the optical elements, a change in the state of polarization can be prevented at least at the image point.

We shall now describe an example which illustrates a method for making the incident polarization and the natural polarization of the optical system coincide according to the above principle.

FIG. 1 shows an example where this invention is applied to a magneto-optic disk device for recording and reproducing information.

The optical system of this device comprises a light source 10, an objective system 20, a prism block 30, and a signal detector system 40. Optical source 10 comprises a semiconductor laser 11 which generates a divergent light beam of linearly polarized light, a collimator 12 which makes this divergent beam parallel, two anamorphic prisms 13, 14 which shape the beam section, and a mirror 15. This emits produces a parallel beam with a circular cross-section.

Objective system 20 comprises an objective lens 21 which converges the beam onto the signal recording surface of a magneto-optic disk MOD, and a mirror 22. Objective lens 21 and mirror 22 are disposed in a head, not shown in the diagram, which slides in the radial direction X of magneto-optic disk (MOD). Further, objective lens 21 is mounted on an actuator disposed within the head which drives it in its axial direction Z and the radial direction X of the disk.

Objective lens 21 consists of a plastic lens to reduce the load on the actuator due to its lightness.

The light beam from the optical source 10 is partially reflected by the second half mirror surface 31b, and converged by condensing lens 34 onto a photodetector 35 for automatic power control of the semiconductor laser 11.

The light reflected from the disk, on the other hand, is also reflected by second half mirror surface 31b, and its direction of polarization is rotated through 45° by half-wave plate 32. It is then split into polarized components P,S by second prism block 33, and converged onto photo-detectors 42a, 42b for detecting magnetically recorded signals via condensing lenses 41a, 41b respectively.

The direction of polarization of the laser light incident on the MOD is rotated by the magneto-optic Kerr effect with respect to the direction of magnetization of the disk where the spot converges. By rotating the resulting light through 45° and separating it into components P,S which are detected by separate photo-detectors, the information recorded on the disk can be read from the difference in signal intensities.

Another part of the light reflected from the disk is reflected by a first half mirror surface 31a, and is converged onto an error detecting photodetector 45 via a condensing lens 43 and cylindrical lens 44. An error detection circuit, not shown in the figure, generates focussing error and tracking error signals from the output of photodetector 45, and a drive circuit moves objective lens 21 based on these signals.

In this example, objective lens 21 is a plastic lens with birefringence, which it can change the polarization state of the light. The natural polarization vectors of objective lens 21 are therefore measured first, and the lens is rotated about the optic axis so that these vectors coincide with those of the incident light beam from source 10. In an actual set-up, the outputs of photodetectors 42a, 42b are monitored, and objective lens 21 is fixed where the differential signal is greatest.

In this way, the dynamic range of the differential signal due to differences in the direction of magnetization on the disk, can be increased without the spot on the MOD suffering any effect due to birefringence.

Further, if the collimator or other optical elements also have birefringence as well as the objective lens, the same effect can be obtained by rotating these lenses about the optic axis.

In the above example, the case was described where the natural polarization of optical elements was made to coincide with the polarization of the incident light beam. As shown by the dotted line of FIG. 1, however, a wave plate 16 such as a half-wave plate, azimuth rotator or polarizer can also be inserted in the optical path between prism 30 and mirror 22 to change the polarization state of the exit light beam. By rotating these polarizing elements about the optic axis, the polarization state of the light beam can again be made to coincide with the natural polarization of optical elements which possess birefringence. Although the wave plate 16 is shown in the Figure to be located between the prism 30 and the mirror 22, the wave plate 16 can also be located at any appropriate location along the optical path of the light beam, such as between prism 14 and mirror 15.

It is clear from this description that according to this invention, polarization anomalies at the image point can be eliminated even in the case of plastic lenses with birefringence, and anomalies in the light distribution pattern can thus be avoided.

What is claimed is:

1. An optical system using polarized light comprising an optical source which emits linearly polarized light and at least one optical element with birefringence through which polarized light from said optical source passes and is converged at an image point, said at least one optical element comprising a plastic lens, said plastic lens being arranged so that the following equation is satisfied in order to maintain a polarization state of the polarized light unchanged:

$$c\alpha = k\alpha$$

where C is the Jones matrix representing an effect of said at least one optical element on the polarization state of the polarized light at the image point, $\alpha$ is the Jones vector representing the polarization state of the polarized light incident on said at least one optical element, and k is a natural value of the matrix C.

2. The optical system according to claim 1, wherein a polarization state is maintained unchanged when a phase difference and an amplitude ratio between two orthogonal components of the polarized light remain unchanged in passing through said at least one optical element.

3. An optical system using polarized light for use in a magneto-optic disk apparatus, comprising an optical source which emits polarized light, at least one plastic lens with birefringence through which polarized light from said optical source passes and is converged onto an optical disk and a polarizing element interposed between said optical source and said at least one plastic lens, said polarizing element being rotatable about an optical axis and being arranged so that the following equation is satisfied in order to maintain a polarization state of the polarized light unchanged:

$$c\alpha = k\alpha$$

where C is the Jones matrix representing an effect of the at least one plastic lens on the polarization state of the polarized light at the optical disk, $\alpha$ is the Jones vector representing the polarization state of the polarized light incident on said at least one plastic lens, and k is a natural value of the matrix C.

4. The optical system using polarized light according to claim 3, wherein said optical source emits linearly polarized light.

5. The optical system using polarized light according to claim 3, wherein said polarizing element is a half-wave plate.

6. The optical system using polarized light according to claim 3, wherein said polarizing element is an azimuth rotator.

7. The optical system using polarized light according to claim 3, wherein said polarizing element is a polarizer.

8. The optical system according to claim 3, wherein a polarization state is maintained unchanged when a phase difference and an amplitude ratio between two orthogonal components of the polarized light remain unchanged in passing through said at least one plastic lens.

9. An optical system for a magneto-optic disk device comprising an optical source which emits a linearly polarized light beam and a plastic objective lens which converges the light beam from said optical source onto a magneto-optical disk, said plastic lens being arranged so that the following equation is satisfied in order to maintain a polarization state of the polarized light beam unchanged, $$c\alpha = k\alpha$$

where C is the Jones matrix representing an effect of said plastic objective lens on the polarization state of said polarized light beam at the magneto-optical disk, $\alpha$ is the Jones vector representing the polarization state of the polarized light beam incident on said plastic objective lens, and k is a natural value of the matrix C.

10. The optical system according to claim 9, wherein a polarization state is maintained unchanged when a phase difference and an amplitude ratio between two orthogonal components of the polarized light beam unchanged in passing through said plastic objective lens.

* * * * *